Aug. 11, 1931.  F. H. OWENS  1,818,502

SOUND REPRODUCING APPARATUS

Filed Sept. 16, 1929

INVENTOR.
FREEMAN H. OWENS

BY *Philip S. Hopkins*
ATTORNEY.

Patented Aug. 11, 1931

1,818,502

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

SOUND REPRODUCING APPARATUS

Application filed September 16, 1929. Serial No. 393,030.

This invention relates to improvements in sound reproducing apparatus, the primary object of the invention being to provide means whereby a photo-electric cell or cells may be disposed in close proximity to a traveling film carrying a photographic sound record or records at the light station or point of translation.

A further object of the invention is to provide, in combination, means for supporting the traveling film in flat and unwrinkled condition at the point of translation, and a photo-electric cell or cells of such size and shape as to permit them to be positioned between the points of support of the film and in close proximity to the latter.

Other objects and advantages of the invention will appear as the description proceeds.

In the drawings accompanying this specification,

Figure 1:
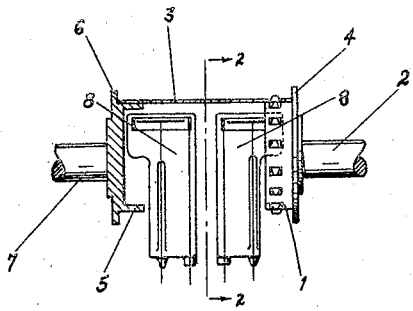
Figure 1 is a partly sectional plan view of a film supporting means, showing a pair of photo-electric cells assembled therewith in accordance with the present invention.

Heretofore, in sound reproducing systems wherein the film is moved over a sprocket or roller at the point where the light passes through the record carried by the film so as to maintain the film absolutely flat and unwrinkled, it has not been possible to dispose the photo-electric cell or cells in sufficiently close proximity to the film to insure maximum efficiency. The present invention comprehends a novel construction of film supporting means and photo electric cells whereby the difficulty above mentioned is entirely overcome in a simple and practical manner.

Referring to the drawings, 1 designates a sprocket secured on a shaft 2 for rotation therewith, said sprocket being adapted to engage the usual perforations formed adjacent to one edge of a film 3, the sprocket being provided with a radial flange 4 adapted to contact with the edge of the film and restrain any tendency of the latter to shift sidewise in one direction. A short roller 5 also provided with a radial flange 6 is mounted on a shaft 7 in axial alignment with the sprocket and spaced therefrom a sufficient distance to support the opposite edge of the film and restrain the latter against movement away from the sprocket. The usual sound record or records carried by the film is or are disposed along that portion of the film lying between the sprocket and the roller 5, whereby light may be projected through said record or records without interference.

Figure 2:
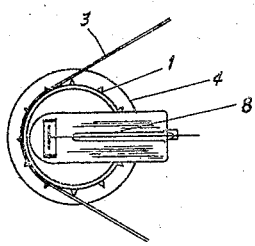
Figure 2 is a transverse sectional view taken on the line 2—2 of Figure 1.

In the space between the sprocket 1 and roller 5 a photo-electric cell or photo-electric cells, depending upon the position of the sound record or records on the film to be reproduced, is or are disposed with their windows in close proximity to the film. In Figures 1 and 2 two cells 8 of identical form are illustrated, said cells being enlarged or approximately L-shaped at their receiving ends thereby to accommodate electrodes of greater capacity than would be possible if the cells were not so shaped. The output of said cells is adapted for connection in the usual manner with a suitable amplifier, not shown. By reason of this construction the light rays which have been modulated by passing through the records will be received by the respective cells immediately after their passage through said records.

Figure 3:
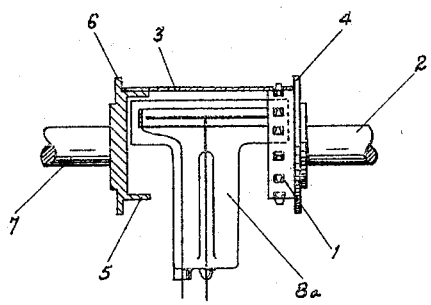
Figure 3 is a view similar to Figure 1, but showing a single photo-electric cell.

In Figure 3 is illustrated a single photo-electric cell 8a of approximately T-shape, said cell being adapted for use in connection with a film having one or more records. It will be apparent that with this form of cell the cross portion thereof will permit the use of electrodes of maximum capacity.

I claim:

In sound reproducing apparatus, the combination of a rotatable sprocket adapted to support a traveling film along one edge thereof, an idler roller mounted for free rotation in axial alignment with said sprocket and adapted to support the film at its opposite edge, said sprocket and roller having flanges for preventing lateral displacement of the film, and a photo electric cell disposed between the sprocket and roller and in close proximity to said film.

In testimony whereof, I affix my signature.

FREEMAN H. OWENS.